(12) United States Patent
Belser

(10) Patent No.: US 6,275,455 B1
(45) Date of Patent: Aug. 14, 2001

(54) SYSTEM AND METHOD FOR GENERATING POSITION ERROR SIGNALS WITHIN A COMPUTER MEMORY DEVICE

(75) Inventor: Karl A. Belser, San Jose, CA (US)

(73) Assignee: Seagate Technology, Inc., Scotts Valley, CA (US)

(*) Notice: Subject to any disclaimer, the term of this patent is extended or adjusted under 35 U.S.C. 154(b) by 0 days.

(21) Appl. No.: 09/017,978

(22) Filed: Feb. 3, 1998

Related U.S. Application Data (63) Continuation-in-part of application No. 08/866,174, filed on May 30, 1997.
(60) Provisional application No. 60/022,775, filed on Jul. 30, 1996, provisional application No. 60/023,476, filed on Aug. 6, 1996, and provisional application No. 60/025,801, filed on Aug. 27, 1996.

(51) Int. Cl.[7] ............................................. G11B 7/09
(52) U.S. Cl. ............................ 369/44.26; 369/44.28; 369/58; 369/32
(58) Field of Search .......................... 369/44.26, 44.27, 369/44.28, 44.29, 44.32, 44.34, 44.41, 44.13, 47, 48, 49, 50, 54, 58, 32, 112, 275.4

(56) References Cited

U.S. PATENT DOCUMENTS

| | | | |
|---|---|---|---|
| 5,134,601 | * 7/1992 | Greenwell et al. | 369/44.26 |
| 5,245,491 | 9/1993 | Horie et al. | 360/114 |
| 5,270,991 | 12/1993 | Verboom | 369/44.26 |
| 5,412,631 | * 5/1995 | Komma et al. | 369/44.23 X |
| 5,493,561 | 2/1996 | Nishiuchi et al. | 369/275.1 |

FOREIGN PATENT DOCUMENTS

0283017 A1   9/1988   (EP).

OTHER PUBLICATIONS

"Handbook of Magneto–Optical Data Recording," Edited by Terry W. McDaniel and Randall H. Victora, Copyright 1997 by Noyes Publications, p148.

* cited by examiner

*Primary Examiner*—Muhammad Edun
(74) *Attorney, Agent, or Firm*—Carr & Ferrell LLP; Gregory J. Koerner; Charles B. Katz (57) ABSTRACT

A system and method for generating position error signals within a magneto-optical computer memory device whose track pitch is close to the full width half maximum width of the laser spot, the narrow track being typical of data stored on magnetic super resolution media. The magneto-optical computer memory device comprises a storage media for storing information, position marks embossed on the storage media, a head device coupled to the storage media for sensing the position marks to generate position error signals, and a correction device coupled to the head device to access the position error signals and responsively position the head device to correctly sense the stored information.

15 Claims, 12 Drawing Sheets

SYSTEM AND METHOD FOR GENERATING POSITION ERROR SIGNALS WITHIN A COMPUTER MEMORY DEVICE

CROSS-REFERENCE TO RELATED APPLICATION

This application is a continuation-in-part of application Ser. No. 08/866,174 filed on May 30, 1997.

This application claims the benefit of: Provisional Application Serial No. 60/022,775, entitled "A Data Storage And Retrieval System Based on Flying Magneto-Optical Head," filed on Jul. 30, 1996; Provisional Application Serial No. 60/023,476, entitled "A Data Storage And Retrieval System Based on A Flying Magneto-Optical Head," filed on Aug. 6, 1996; Provisional Application Serial No. 60/025,801, entitled "A Data Storage And Retrieval System Based on A Flying Magneto-Optical Head," filed on Aug. 27, 1996; patent application Ser. No. 08/844,208, entitled "Maximum Data Storage For Magneto-Optical Storage System," filed on Apr. 18, 1997; and patent application Ser. No. 08/866, 174, entitled "System And Method For Generating Position Error Signals Within A Magneto-Optical Computer Memory Device," filed on Jun. 30, 1997 The subject matter of each of these related applications is incorporated herein by reference. All related applications are commonly assigned.

BACKGROUND OF THE INVENTION

1. Field of the Invention

This invention relates generally to memory systems and more particularly to a system and method for generating position error signals within a magneto-optical computer memory device.

2. Description of the Background Art

Efficient and economic storage of digital information is an important consideration of manufacturers, designers and users of computing systems. In magneto-optical storage devices, digital data is typically stored in tracks located on rotating disks of MO storage media. Close positioning of the adjacent disk tracks maximizes the amount of stored data on a storage disk, thus providing significant economic benefits to system manufacturers and users. Therefore, system designers frequently seek new and improved methods of reducing track pitch to permit greater storage capacity on the storage media.

Figure 1A:
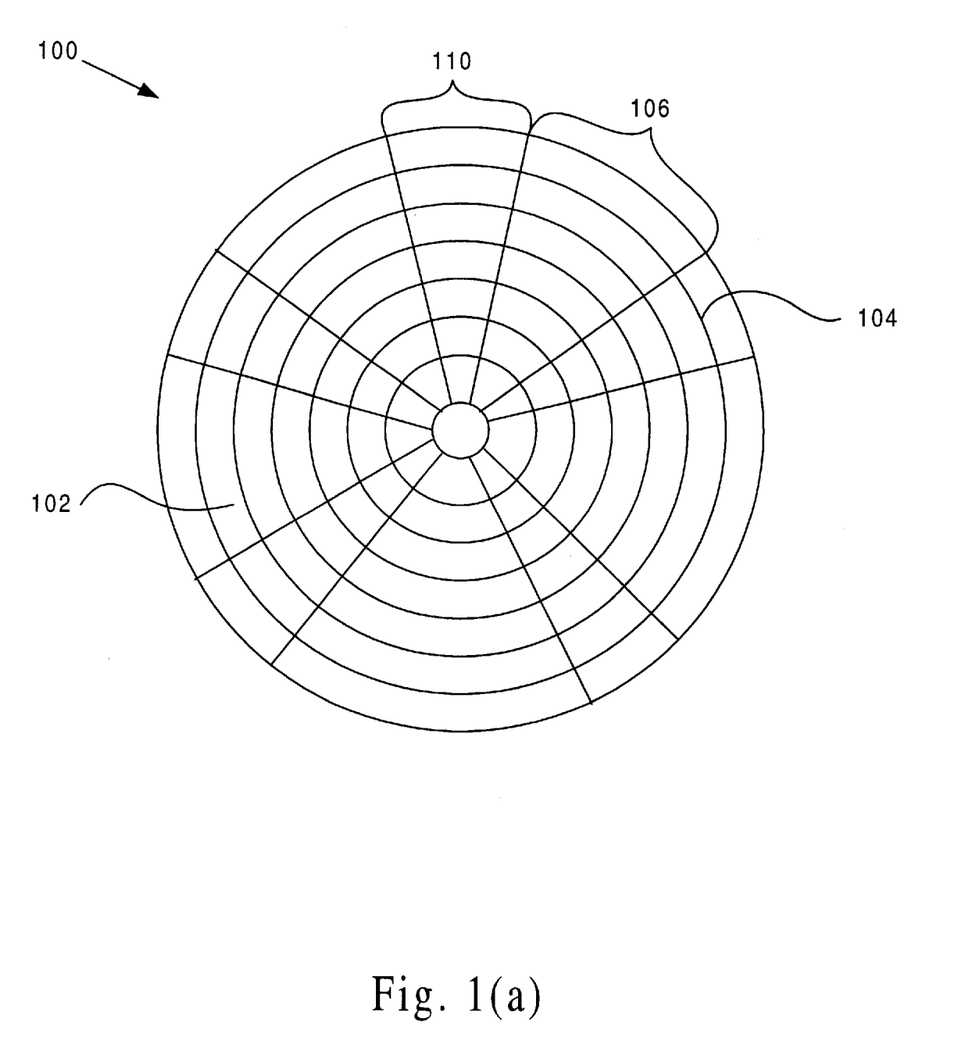
FIG. 1(a) is a plan view of a front surface magneto-optical storage media, according to the present invention.

Referring now to FIG. 1(a), a plan view of a front surface 112 of a magneto-optical storage media 110 is shown. In magneto-optical storage devices, digital data is typically written into and read from a series of concentric or spiral tracks 114 located within a plurality of data wedges 177 on the surface 112 of storage media 110. In practice, the digital data is read from the front surface 112 of storage media 110 by projecting a laser-generated light spot from a flying read/write head onto a selected track 114 while storage media 110 is rotating, and then sensing the polarization of light reflected back from storage media 110.

The read/write head must be accurately positioned above track 114 of rotating storage media 110 during a read/write operation on that track. Many factors (for example, imperfections in track symmetry) may cause the read/write head to be positioned slightly off the center of track 114, thus requiring position correction of the head for acceptable performance during a read/write operation. One prior art position correction method utilizes a diffraction pattern to generate a position error signal from grooves that are positioned between tracks on the media. Another correction technique is the use of pre-patterned media with position marks embossed on the tracks within a plurality of servo sectors 178 to generate a position error signal (PES). The PES may then provide feedback to compensate for position errors by adjusting the radial position of the read/write head.

Figure 1B:
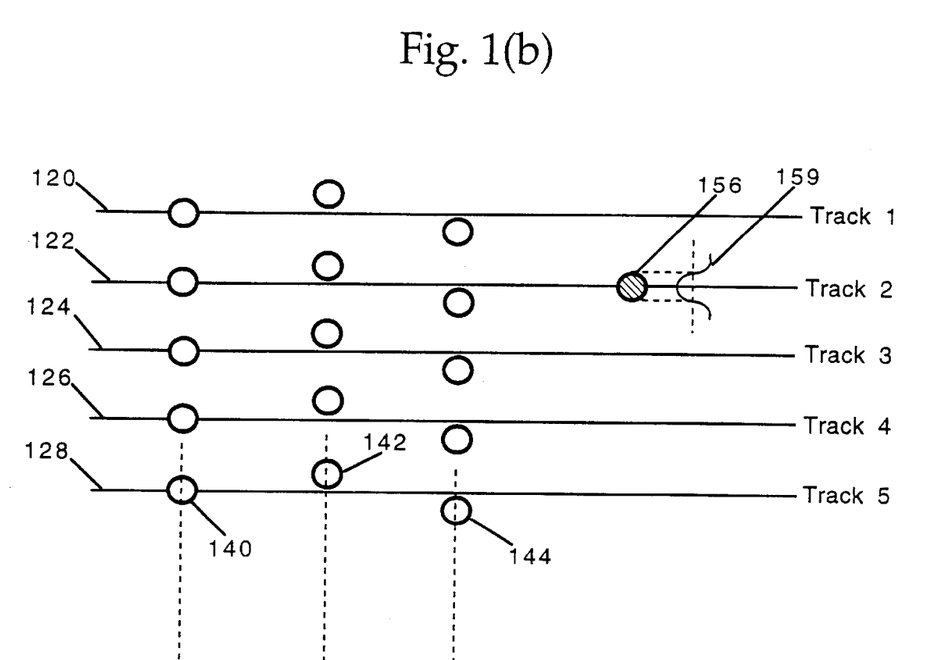
FIG. 1(b) is a diagram of position marks and a representative FWHM diameter of an optical spot on a track of a storage media.

Referring now to FIG. 1(b), a diagram of position marks on sample storage media tracks within a servo sector is shown. FIG. 1(b) includes sample tracks 1 (120) through 5 (128). In FIG. 1(b), five tracks are presented for purposes of illustration, however storage media 110 typically contains a significantly larger number of tracks. Furthermore, FIG. 1(b) depicts track 1 (120) through track 5 (128) as being straight, whereas in practice they are typically circular. As shown in FIG. 1(b), each track 1 (120) through 5 (128) has three associated position marks which may be repeated at selected intervals along their corresponding track. The position marks are formed by depressions in the surface 112 of storage media 110 and effectively reduce the reflectivity of surface 112 to thereby attenuate light reflected back to the read/write head from within a full width half maximum diameter of an optical spot 154 formed by an impinging beam of light. Since the operation of each track is similar, track 5 (128) will be used in conjunction with FIG. 1(c) to describe the function of respective position marks 140, 142 and 144.

Figure 1C:
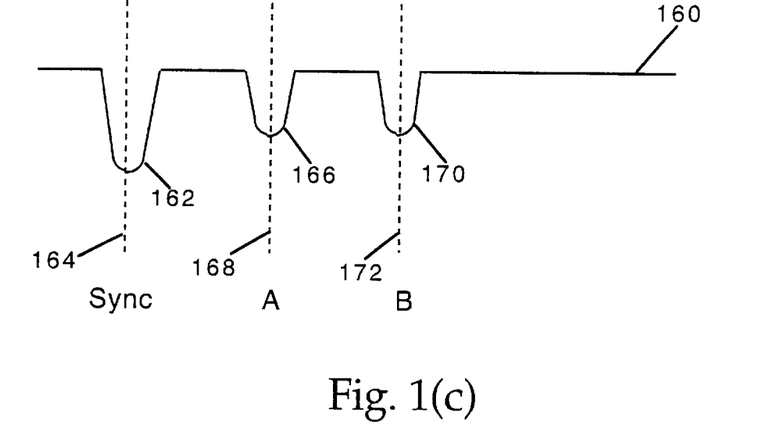
FIG. 1(c) is a drawing of a reflectivity waveform corresponding to the position marks of FIG. 1(b)

Referring now to FIG.1(c), a drawing of a reflectivity waveform corresponding to position marks 140, 142 and 144 (FIG. 1(b)) is shown. During a read/write operation on track 5 (128), the read/write head is positioned over track 5 (128) as media 110 rotates at a selected rate of speed. The read/write head initially encounters position mark 140 which is centered on track 5 (128) and which then generates a sync pulse 162 at time 164.

Next, the flying head encounters position mark 142 which is positioned at a specified perpendicular distance "D" off-center of track 5 (128), in the direction of track 4 (126). Position mark 142 then generates a pulse "A" 166 at time 168. The amplitude of pulse A 166 is relatively less than the amplitude of sync pulse 162. Then, the read/write head encounters position mark 144 which is positioned at the same specified perpendicular distance "D" off-center of track 5 (128), but in the opposite direction of position mark 142. Position mark 144 then generates a pulse "B" 170 at time 172. The amplitude of pulse B 170 is also relatively less than the amplitude of sync pulse 162. The radial position error signal (PES) for the read/write head may thus be obtained by taking the difference of the peak reflectivity amplitudes of pulse A 166 and pulse B 170. The separation of the edges of position marks 142 and 144 determines the linearity of the PES.

In prior art storage systems, the optimal diameter of position marks is equivalent to the full width half maximum (FWHM) value with an optical spot formed by an impinging read/write laser beam, and the distance between adjacent tracks is typically two times this FWHM diameter. FIG. 1(b) illustrates an intensity profile 159 of the light spot and the width 156 of the light spot at the FWHM value. In the prior art, spacing between adjacent tracks is also limited by the size and pattern of the position marks. The limit on increased spacing between adjacent tracks reduces the maximum data density available from the storage media. What is needed, therefore, is an improved system and method that overcomes the aforementioned limitations of the prior art.

SUMMARY OF THE INVENTION

In accordance with the present invention, a system and method are disclosed to generate position error signals within a magneto-optical memory device that implements very narrow track pitches relative to the prior art. In one embodiment of the present invention, narrow track pitches are enabled through the use of a magnetic super resolution storage media that utilizes an aperture within an optical spot. In the preferred embodiment, the track pitch is approximately the full width half maximum (FWHM) diameter of the optical spot. In the preferred embodiment of the present invention, tracks on the magnetic super resolution storage media are pre-patterned with position marks using a manufacturing process. The position marks preferably include a synchronization mark centered on each track followed by sequential "A" and "B" position error marks which are perpendicularly offset on the opposite sides of each track by a selected distance.

In the preferred embodiment, the tracks are sequentially numbered with whole numbers and include sequential pairs of adjacent odd-numbered tracks and even-numbered tracks. The odd-numbered tracks sequentially include an odd synchronization mark centered directly on the track, an odd "A" errbr mark positioned a selected perpendicular distance from the center of the track in a first direction, and an odd "B" error mark positioned the same selected perpendicular distance from the center of the track, but in a second opposite direction.

The even-numbered tracks sequentially include an even synchronization mark centered directly on the track adjacent to the odd synchronization mark, an even "B" error mark positioned the same selected perpendicular distance from the center of the track in the above-mentioned second direction, and an even "A" error mark positioned the same selected perpendicular distance from the center of the track, but in the above-mentioned first direction. In the preferred embodiment, the even "B" error mark is perpendicularly adjacent to an odd "A" error mark which is in the above-mentioned second direction. The even "A" error mark is perpendicularly adjacent to an odd "B" error mark which is in the above-mentioned first direction. In the preferred embodiment, the diameter of the error marks is approximately ⅔ the full width half maximum diameter and of such a diameter that spacing between adjacent tracks is not limited to a value greater than approximately the full width half maximum diameter of the optical spot by the size and pattern of the error marks.

The pre-patterned storage media is then installed in a magneto-optical (MO) drive which rotates the storage media, positions a flying head over the storage media and focuses a laser beam spot on selected tracks to perform read and write operations. In order to correct for radial position errors in the flying head, a drive module in the MO drive calculates a position error signal (PES) based on the relative position of the flying head and the pre-patterned position marks.

A servo control module in the MO drive then accesses the PES and converts it into a servo control current which is used to adjust the flying head to compensate for any radial deviations from the center of the selected track. The present invention maintains the flying head in the correct position to accurately read or write data on the storage media and effectively permits magneto-optical drive devices to provide higher data density that is more robust and reliable than the prior art.

DETAILED DESCRIPTION OF THE PREFERRED EMBODIMENT

The present invention comprises a system and method for generating position error signals within a magneto-optical memory device, and includes a storage media for storing information, position marks embossed on the storage media, a head device coupled to the storage media for sensing the position marks to generate position error signals, and a correction device coupled to the head device to access the position error signals and responsively position the head device to correctly sense the stored information.

Figure 2:
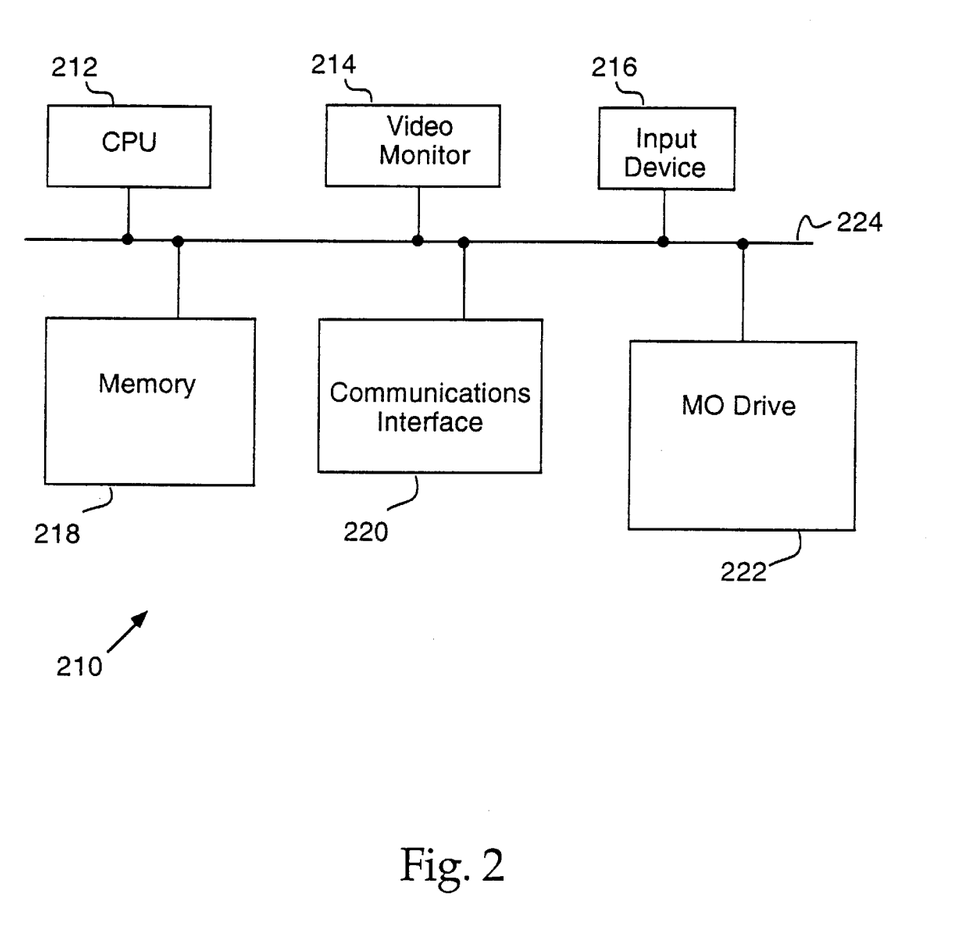
FIG. 2 is a block diagram of a computer system including a magneto-optical drive, according to the present invention.

Referring now to FIG. 2, a computer 210 is shown according to the present invention. Computer 210 preferably comprises a central processing unit (CPU) 212, a video monitor 214, an input device 216, a memory 218, a communications interface 220 and a magneto-optical drive 222. Each element of computer 210 is preferably coupled to a common system bus 224. Memory 218 may alternatively comprise various storage-device configurations, including Random-Access-Memory (RAM), Read-Only-Memory (ROM) and non-volatile storage devices such as floppy disks. Magneto-optical drive 222 receives, stores and retrieves various types of digital information and is further discussed below in conjunction with FIGS. 3 through 8.

Figure 3:
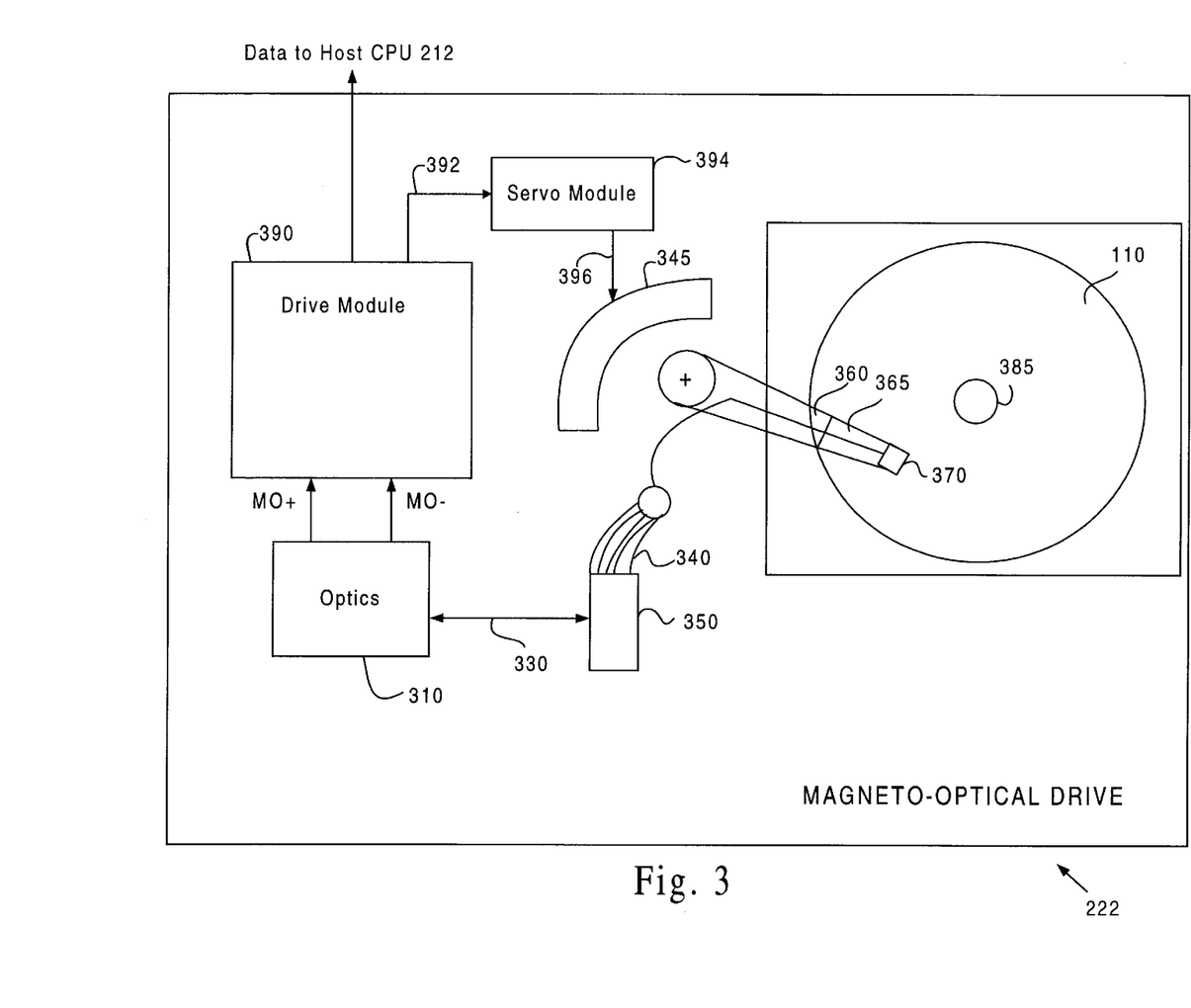
FIG. 3 is a pictorial view of the magneto-optical drive of FIG. 2, according to the present invention.

Referring now to FIG. 3, a pictorial view of the FIG. 2 magneto-optical drive 222 is shown. In the present invention, the mechanical architecture of magneto-optical drive 222 incorporates Flying Magneto-Optical (FMO) head technology with Winchester-type rotary actuator arm, suspension, and air bearing technology in a Magneto-Optical (MO) data storage system. In the preferred embodiment, magneto-optical drive 222 includes optics assembly 310, a Single-Mode Polarization Maintaining (SMPM) optical fiber 330, a fiber optic switch 350, an actuator magnet and coil 345, a plurality of SMPM optical fibers 340, a plurality of head arms 360, a plurality of suspensions 365, a plurality of FMO heads 370, a drive module 390, a servo module 394 and a plurality of MO storage media 110.

Each of the plurality of MO storage media 110 are preferably mounted on a spindle 385 for continuous rotation at a constant angular velocity and each of the plurality of FMO heads 370 are preferably attached via a respective flexible suspension 365 and head arm 360 to the electromagnetic actuator magnet and coil 345. Those skilled in the art will recognize that MO drive 222 may comprise as few as one FMO head 370 and one MO storage media 110 or an upper and lower FMO head 370 per a plurality of MO storage media 110.

Figure 4:
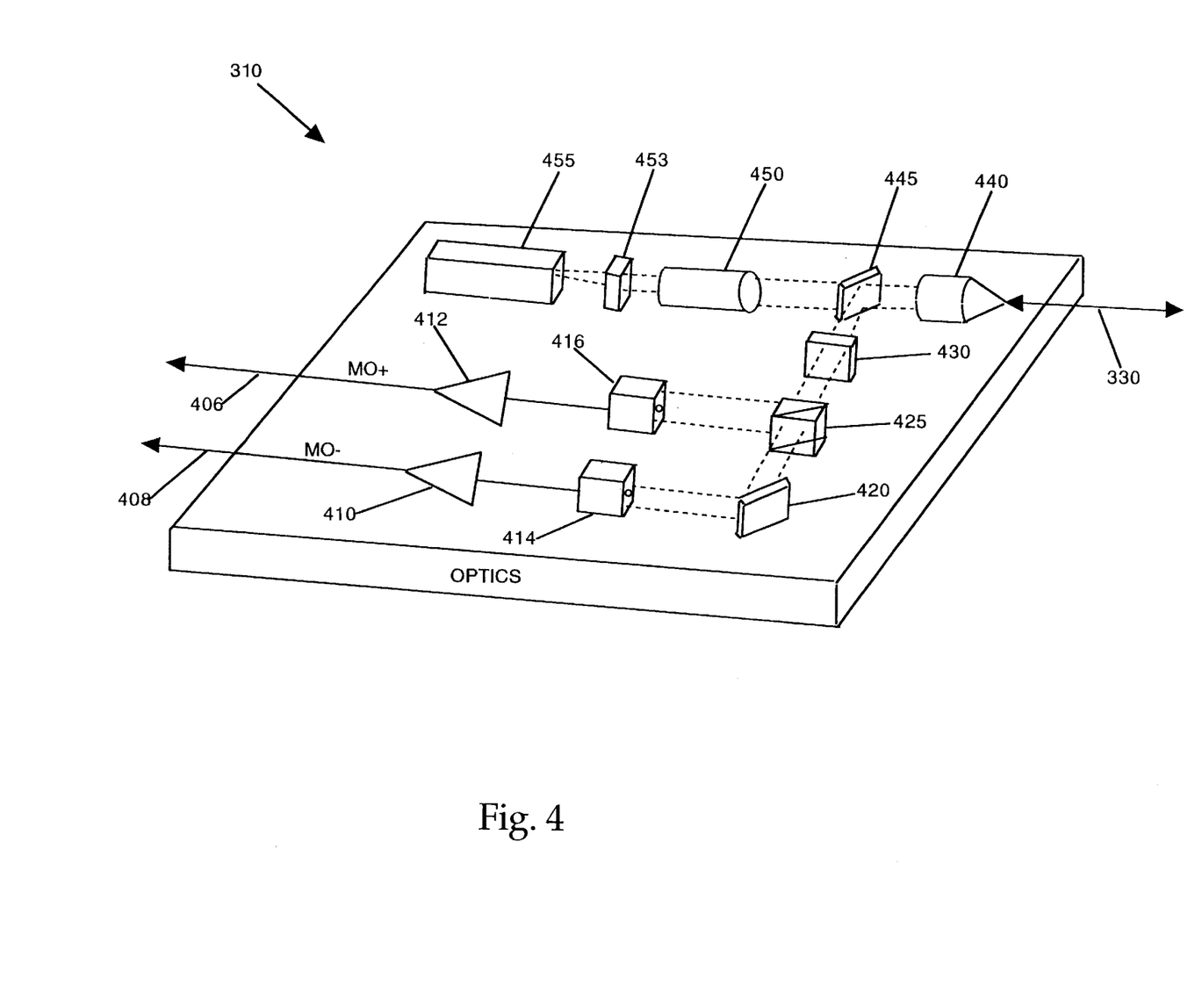
FIG. 4 is a schematic view of the optics assembly of FIG. 3, according to the present invention.

Referring now to FIG. 4, a schematic view of the FIG. 3 optics assembly 310 is shown. Optics assembly 310 includes: a photo-detector system and associated optical components, preferably as a separate subassembly 310 or alternatively as a hybrid integrated circuit component. In the preferred embodiment, optics assembly 310 further includes: a distributed feedback (DFB) laser diode 455 polarized optical light source operating in the visible or near ultraviolet region, a leaky beam splitter 445, collimating optics 450 and an optical isolator 453 that are used before passing the laser light from the laser diode 455 to leaky beam splitter 445, and a coupling lens 440 that is preferably a Gradient Refractive Index (GRIN) lens that focuses outgoing light from leaky beam splitter 445 into a Single-Mode Polarization-Maintaining (SMPM) optical fiber 330 feed.

In the preferred embodiment, fiber optic switch 350 (FIG. 2) accepts optical fiber 330 at an input port and routes the light emanating from fiber 330 to one of the optical fibers 340 at an output port. The switching properties of fiber optic switch 350 are bi-directional so that light propagating back to the switch 350 along any one of the SMPM optical fibers 340 at the output port may also be routed to the optical fiber 330 at the input port. The SMPM optical fibers 340 from the fiber optic switch 350 are preferably routed along respective head arms 360 and suspensions 365 to respective flying magneto-optical heads 370.

Figure 5A:
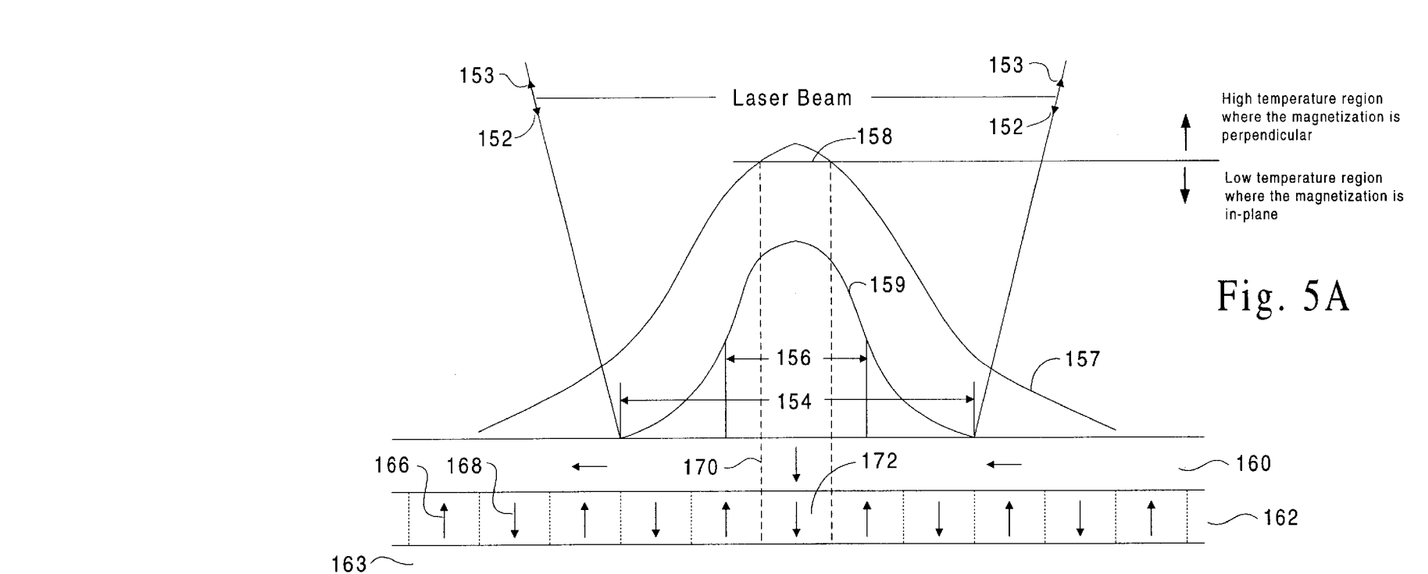
FIGS. 5a and 5b illustrate a temperature profile and a FWHM diameter of a laser beam impinging on a cross-section of the media and a top view of an aperture formed over magnetic domains in the media are shown, respectively.
Figure 5B:
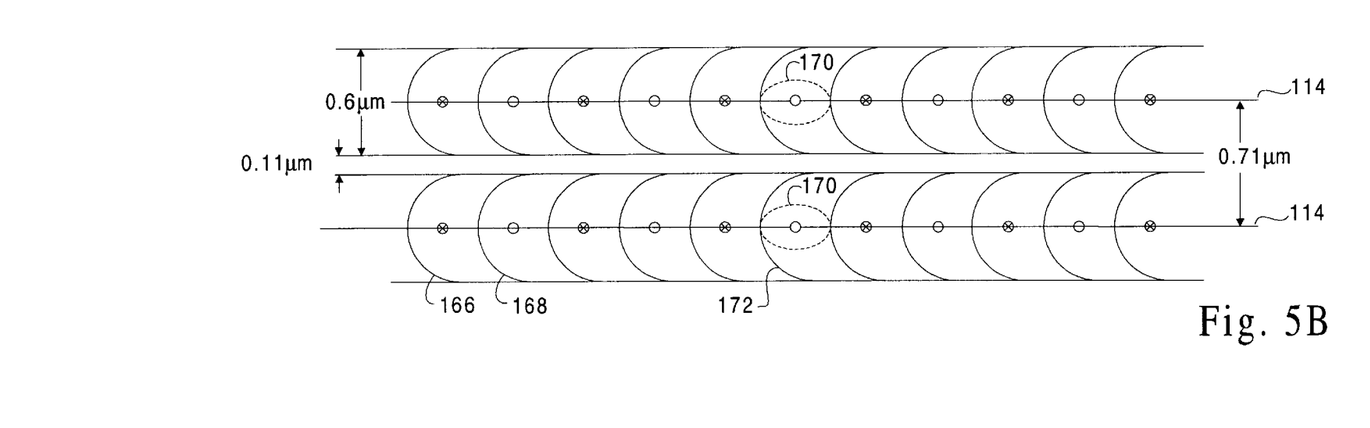

Referring now to FIGS. 5a and 5b, a temperature profile and the FWHM diameter of a laser beam impinging on a cross-section of the media is shown and a top view of an aperture formed over magnetic domains in the media is shown, respectively. During writing, a polarized laser beam 152 is directed from a respective optical fiber 340 and FMO head 370 towards a particular data wedge 177 on a respective surface of a rotating magneto-optical storage media 110. In the preferred embodiment, storage media 110 is a magnetic super resolution (MSR) media, of a variety well known in the art, which includes a top read-out layer 160 and a buried MO storage layer 162. The laser beam 152 impinges on the readout layer 160 as an optical spot 154. A full width half maximum (FWHM) diameter 156 of the optical spot 154 is indicated in FIG. 5A. The optical spot 154 preferably heats the storage layer 162; a typical temperature profile formed in the storage layer 162 below the optical spot 154 is illustrated in FIG. 5a. For a given temperature of the storage layer 162 above a Curie point 158, application of an external magnetic field by a coil on the head 370 preferably will orient magnetic dipoles within a magnetic region 172 of the storage layer in either an up or down direction. Depending on the direction of the external magnetic field, information embodied in the direction of the externally applied magnetic field is stored in the storage layer 162. The magnetic region 172 is formed using an external magnetic field that is applied using magnetic field modulation techniques (MFM) that are well known in the art such that, successive magnetic regions 172 overlap each other to form a crescent shaped pattern as is illustrated in FIG. 5B. For writing, the power level of the laser beam 152 is maintained to form the magnetic regions 172 with a preferable cross-track width of approximately 0.6 um and, depending on the modulation frequency of the magnetic field; with an in-track width between approximately 0.23 and 0.46 um.

During the reading of data, the polarized laser beam 152 is applied with a lower power than during writing. The polarized laser beam 152 is transmitted through the optical fiber 340 to the head 370 and towards the media 110 to preferably form a read "aperture" 170. However, those skilled in the art will recognize that movement of the media below the laser beam 152 results in a sight elongation of the aperture 170. Those skilled in the art will also recognize that in contrast to the prior art, the aperture 170 of the present invention permits reading of data from a region of the media 110 that is smaller than the width of the optical spot 154, and, thus, from data tracks 114 that are spaced closer together than the prior art. During reading, the flux emanating from a previously written magnetic region 172 is preferably coupled to the magnetic dipoles within the aperture 170 formed in the readout layer 160 and oriented such that the dipoles within the aperture 170 point in either an up or down direction, depending on the information stored in the magnetic region 172. The polarized laser beam 152 is reflected from the readout layer 160 with an amplitude and a polarization rotation that depends on the orientation of the dipoles in the readout layer 160 and with a polarization rotation that is rotated relative to laser beam 152. The amplitude and polarization rotation are embodied in a reflected laser beam 153. The readout process produces either positively-rotated light or negatively-rotated light. In this way, the pattern of up or down magnetization orientations (representative of the stored digital data) modulates the polarization of the light reflected from storage media 110.

The reflected light signal from storage media 110 couples back through the FMO head 370, one of the plurality of SMPM optical fibers 340, and the fiber optic switch 350, and finally reaches lens 440 via optical fiber 330. Leaky beam splitter 445 then transmits the reflected light signal through half-wave plate 430 to polarizing beam splitter 425 which discriminates against positive and negative planes of polarization in the received light. Polarizing beam splitter 425 sends reflected light having a positive plane of polarization to photo-detector 416, and also sends reflected light having a negative plane of polarization to photo-detector 414.

Photo-detector 416 responsively converts the positively-rotated light into a proportional analog voltage which is amplified by preamplifier 412 before being transmitted to drive module 390 via line 406. Likewise, photo-detector 414 responsively converts the negatively-rotated light into a proportional analog voltage which is amplified by preamplifier 410 before being transmitted to drive module 390 via line 408.

In addition to data information, storage media 110 also contains pre-recorded servo information or position marks which MO drive 222 reads and then uses to accurately position head 370 over a selected track on storage media 110. In the preferred embodiment, the servo or position marks are prerecorded along the tracks in the plurality of servo sectors 178 which are disposed on the storage media 110 between the data wedges 177. In some prior art optical drives, a head is positioned over a media based on diffraction information transmitted in a laser beam reflected from grooves disposed between tracks on the media. In the present invention, because the SMPM optical fibers 340 do not convey diffraction information accurately, diffraction information is not used to position the head 370 over the media 110. Instead, the present invention positions the head 370 over a particular track by generating reflectivity signals from a reflection of the laser beam 152 from position marks that fall within a full width half maximum (FWHM) diameter of the optical spot 154. Drive module 390 uses the reflectivity signals to derive a position error signal (PES) which is provided as feedback via line 392 to servo module 394 (FIG. 3). Servo module 394 then generates a servo control current which is proportional to the received PES and provides the generated servo control current via line 396 to actuator 345 which responsively adjusts the position of flying head 370. In the preferred embodiment, actuator 345 serves as a coarse adjustment to position head 370. Flying head 370 preferably also includes a dynamic mirror which may advantageously deflect the read/write laser beam spot in response to the generated servo control current to thus provide a fine adjustment for correcting 11 radial position errors of head 370.

Figure 6:
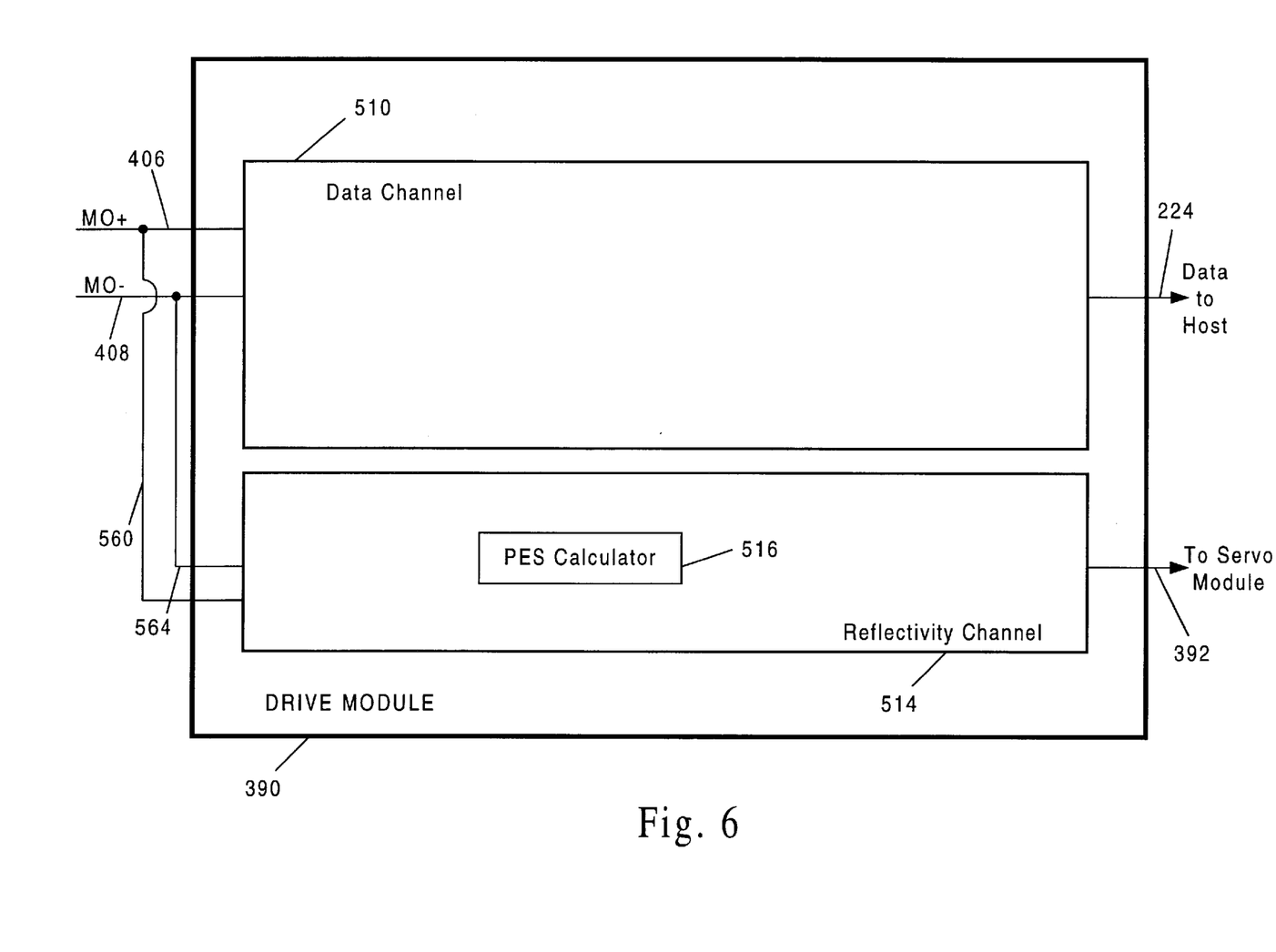
FIG. 6 is a block diagram of the drive module of FIG. 3, according to the present invention.

Referring now to FIG. 6, a schematic diagram of the preferred embodiment for the FIG. 3 drive module 390 is shown. In the preferred embodiment, drive module 390 includes two separate channels (data channel 510 and reflectivity channel 514) because two distinctly different types of light sensing are utilized by magneto-optical drive 222. As discussed above, data channel 510 senses light reflected from the data wedges 177 in the storage media 110 to determine rotation of the plane of polarization (corresponding to each magnetically-recorded domain) and thus responsively generates corresponding digital data.

In contrast, reflectivity channel 514 senses the amplitude of light reflected from the servo sectors 178 in the storage media 110. For example, during read mode, the amplitude of reflected light is destructively interfered with whenever the reading light beam strikes the pre-patterned position marks embossed upon storage media 110. Reflectivity channel 514 then responsively utilizes the sensed reflectivity signal to derive position error signals which are used to adjust and correct the radial position of head 370.

In normal operation, data channel 510 receives the MO+ signal from optics assembly 310 via line 406 and receives the MO− signal from optics assembly 310 via line 408. Data channel 510 responsively processes the MO+ and MO− signals to generate a data signal on line 224.

Reflectivity channel 514 also accesses the MO+ signal via line 560 and the MO− signal via line 564 and responsively processes the reflectivity information to generate a position error signal (PES) which is provided to servo module 394 via line 392. Reflectivity channel 514 preferably includes a PES calculator 516 which calculates the PES as described above in the discussion of FIGS. 1(b) and 1(c). In the preferred embodiment, however, the off-track position error is normalized to provide a PES which is independent of parameter variations like the reflectivity of storage media 110 or the amount of power applied by laser 455. Therefore, referring again to FIGS. 1(b) and 1(c), the PES is preferably equal to the amplitude of pulse A 166 minus the amplitude of pulse B 170 divided by the amplitude of pulse A 166 plus the amplitude of pulse B 170. In other words, PES calculator 516 preferably calculates the PES using the following formula:

$$\frac{A-B}{A+B}$$

Figure 7:
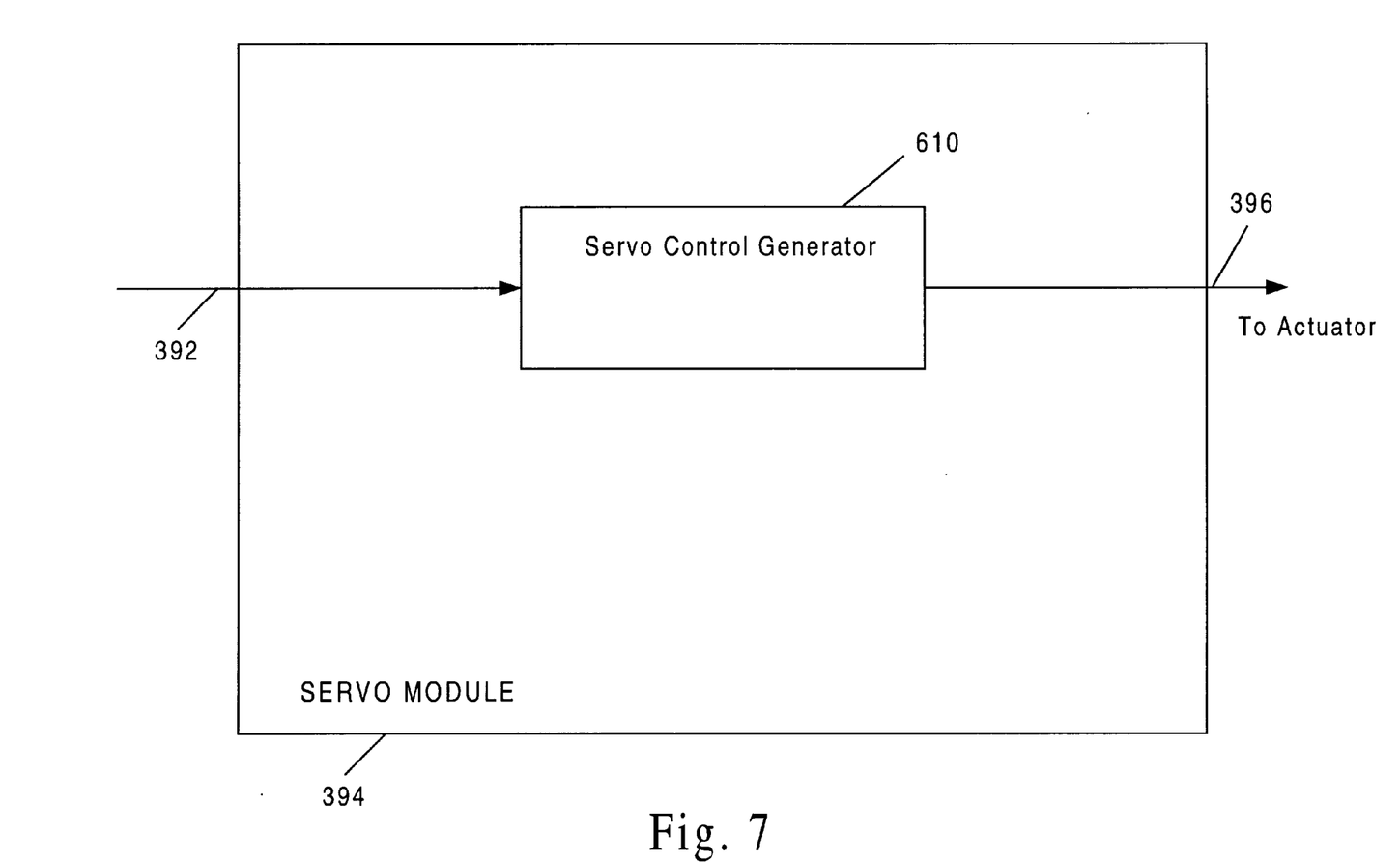
FIG. 7 is a block diagram of the servo module of FIG. 3, according to the present invention.

Referring now to FIG. 7, a block diagram of servo module 394 of FIG. 3 is shown. Servo module 394 includes a servo control generator 610 which receives the PES from drive module 390 via line 392 and responsively generates a servo control current which is provided via line 396 to adjust and control the position of head 370. In the preferred embodiment, servo control generator 610 uses a digital signal processor to process the received PES using a lead-lag transfer function which generates a servo control current that is proportional to the received PES signal. Alternately, servo control generator 610 may convert the PES into the servo control current using a hardware implementation.

Figure 8A:
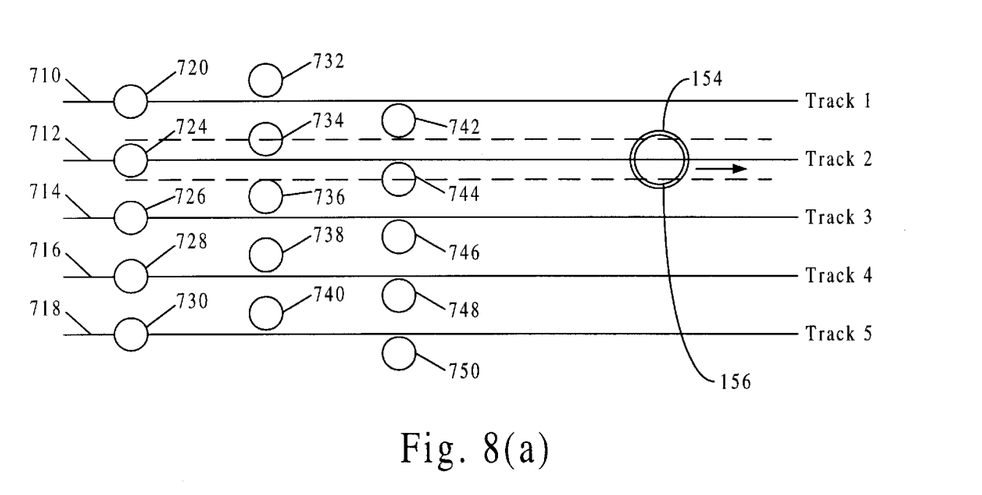
FIG. 8(a) is a diagram of one embodiment for position marks on sample tracks of a magneto-optical storage media, according to the present invention.

Referring now to FIG. 8(a), a diagram of one embodiment for position marks on sample tracks 710–718 of a storage media 110 is shown. As discussed above with reference to FIGS. 4(a–b), the present invention reads data in the data wedges 177 from within the aperture 170 formed in the magnetic super resolution (MSR) media 110. The FWHM diameter 156 of the optical spot 154 is preferably approximately 0.6 microns and the aperture 170 is nominally approximately 0.4 microns in diameter. Because the aperture 170 may be formed with a smaller diameter than the optical spot 154, intersymbol interference between adjacent magnetic regions 172 and adjacent tracks is reduced during reading of data. Although, reduced intersymbol interference permits data to be read from tracks that are more closely spaced than in the prior art, those skilled in the art will recognize that the spacing between adjacent tracks is also limited by the particular pattern and size of the position marks. For example, when maintaining a position of the head 370 over track 2 using a reflectivity signal from a position mark 744, at some non-optimal spacing between tracks, a reflectivity signal from a position mark 742 associated with track 1 will be detected within the FWHM diameter 156 of the optical spot 154 such that, the reflectivity signal from position mark 742 will add to the reflectivity signal from position mark 742 and, thus, alter the PES signal such that the head 370 will be driven off-center from track 2.

Figure 8B:
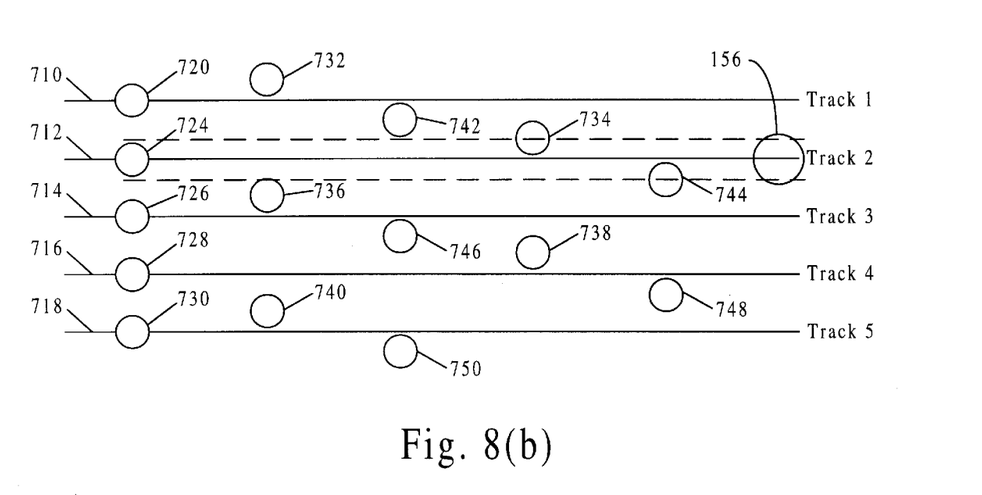
FIG. 8(b) is a diagram of one embodiment for position marks on sample tracks of a magneto-optical storage media, according to the present invention.

Referring now to FIG. 8(b), a diagram of another embodiment for position marks on sample tracks of a storage media 110 is shown. The FIG. 8(b) embodiment seeks to correct the overcrowded radial positioning of FIG. 8(a). In FIG. 8(b), odd-numbered tracks 1, 3 and 5 (710, 714 and 718) are the same as in FIG. 8(a), but even-numbered tracks 2 and 4 (712 and 716) have position marks 734, 744, 738 and 748 repositioned some further distance from respective position marks 732, 742, 736, 746, 740 and 750 (to which they were adjacent in FIG. 8(a)). In this embodiment, the tracks may be spaced closer than in the embodiment illustrated in FIG. 8(a) since with a reduced spacing between tracks (from that in FIG. 8(b)) a reflectivity signal will be detected within the FWHM diameter 156 of the optical spot 154 from only one position mark. This pattern of position marks is still not entirely optimal, however, because compared to the FIG. 8(a) embodiment, the pattern of the position marks 734, 744, 738 and 748 in the FIG. 8(b) embodiment requires approximately twice the in-track space.

Figure 8C:
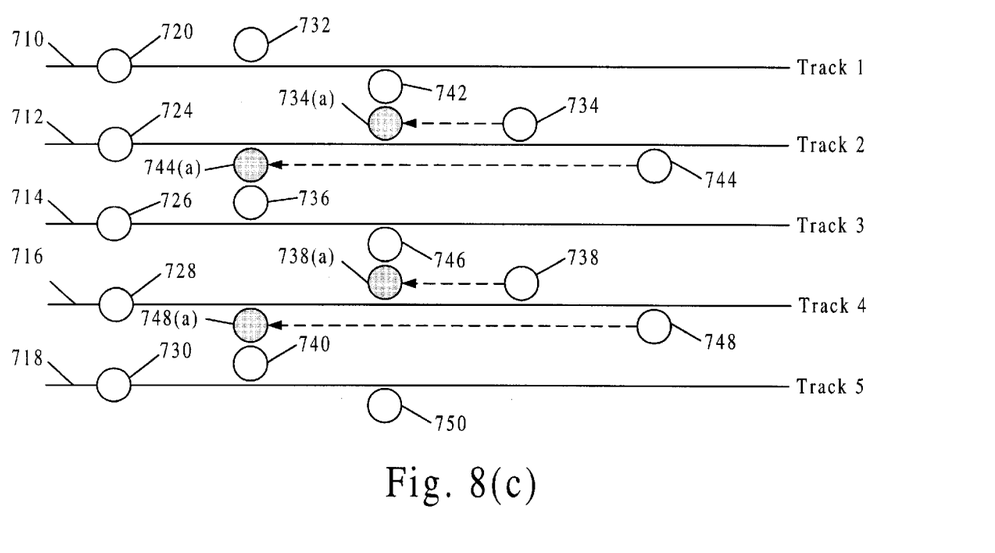
FIG. 8(c) is a diagram for modifying the FIG. 8(b) embodiment of position marks, according to the present invention.

Referring now to FIG. 8(c), a diagram for modifying the FIG. 8(b) embodiment of position marks 720–750 is shown. In FIG. 8(c), position mark 734 is moved to position 743(a), and position mark 744 is moved to position 744(a). Further, position mark 738 is moved to position 738(a), and position mark 748 is moved to position 748(a). The FIG. 8(c) modifications result in the embodiment shown and discussed in conjunction with FIG. 8(d).

Figure 8D:
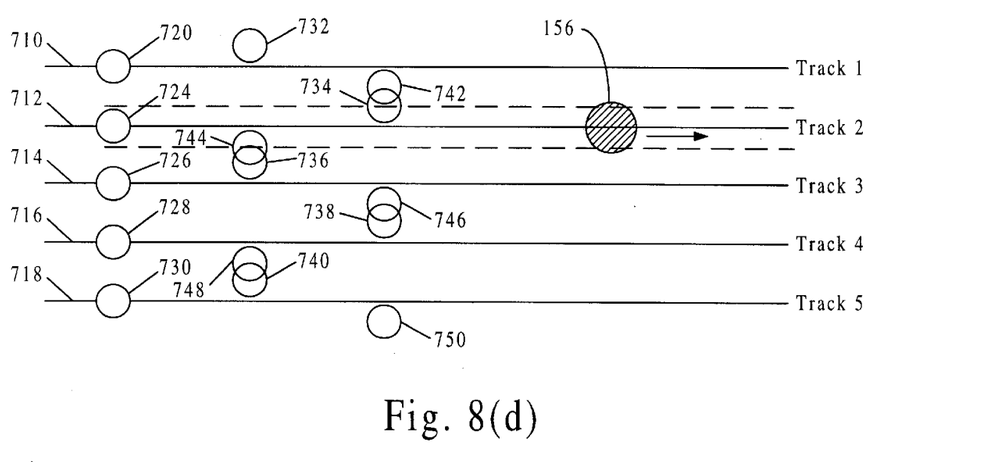
FIG. 8(d) is a diagram of the preferred embodiment of position marks, in which selected marks overlap according to the present invention.

Referring now to FIG. 8(d), a diagram of the preferred embodiment of a pattern of position marks 720–750 is shown. The modifications described above in conjunction with FIG. 8(c) result in the preferred embodiment shown in FIG. 8(d). Because of the particular configuration of position marks 720–750, the FIG. 8(d) embodiment successfully avoids the particular problems associated with FIG. 8(a) and 8(b).

In the preferred embodiment, the tracks on storage media 110 are sequentially numbered with whole numbers and include sequential pairs of adjacent odd-numbered tracks and even-numbered tracks. In the FIG. 8(d) example, for purposes of illustration, the odd-numbered tracks are shown as tracks 1, 3 and 5 (710, 714 and 718) and the even-numbered tracks are shown as tracks 2 and 4 (712 and 716). The odd-numbered tracks sequentially include an odd synchronization mark centered directly on the track (respective marks 720, 726 and 730), an odd "A" error mark positioned a selected perpendicular distance from the center of the track in a first direction (respective marks 732, 736 and 740), and an odd "B" error mark positioned the same selected perpendicular distance from the center of the track, but in a second opposite direction (respective marks 742, 746 and 750).

The even-numbered tracks sequentially include an even synchronization mark centered directly on the track adjacent to the odd synchronization mark (respective marks 724 and 728), an even "B" error mark positioned the same selected perpendicular distance from the center of the track in the above-mentioned second direction (respective marks 744 and 748), and an even "A" error mark positioned the same selected perpendicular distance from the center of the track, but in the above-mentioned first direction (respective marks 734 and 738).

Referring briefly back to FIG. 5B, in an exemplary embodiment of the present invention, with an optical spot 154 that has a full width half maximum (FWHM) diameter 156 of approximately 0.6 microns and an aperture 170 with a nominal 0.4 um diameter, a minimum spacing between adjacent tracks 710–718 is that is achievable is approximately 0.71 um when including a tracking misregistration distance between tracks 114 of 0.11 um. Those skilled in the art will recognize that the misregistration zone is typically used to provide, an area between tracks for inaccuracies in the head tracking servo circuitry discussed with reference to FIG. 7. The present invention, thus, identifies that a minimum spacing between adjacent tracks is achievable with the preferred embodiment of position marks 720–750 such that, the minimum spacing between adjacent tracks may be on the order of the FWHM diameter 156 of the optical spot 154 or, alternatively such that, the minimum spacing between adjacent tracks is equivalent to approximately the FWHM of the optical spot 154 plus approximately 0.11 um. In contrast, the prior art spacing between adjacent tracks is typically two times the FWHM diameter of the optical spot 154. In furtherance of a minimal spacing between adjacent tracks, the present invention also identifies that an optimal reflectivity signal will be obtained when the position marks are ⅔ as wide as the FWHM diameter 156 of the optical spot 154 and a quarter wave-length of the laser beam 152 as deep.

Accordingly, in the exemplary embodiment, a diameter of the position marks 720–750 is approximately 0.4 microns in diameter. As illustrated in FIG. 8d, the distance between tracks 710–718 and the size, spacing, and pattern of the position marks 734–746 results in an overlap of the position marks. In the preferred embodiment, the even "B" error mark is perpendicularly adjacent to and overlaps an odd "A" error mark which is in the above-mentioned second direction (for example, marks 744 and 736 or marks 748 and 740). The even "A" error mark is perpendicularly adjacent to and overlaps an odd "B" error mark which is in the above-mentioned first direction (for example, marks 742 and 734 or marks 746 and 738).

In contrast to the embodiments illustrated in FIG. 8(a), the aforementioned overlap of position marks ensures that, during positioning of the head 370 along track 2 using the reflection of the laser beam 152 from position mark 734 that falls within the FWHM diameter 156 of the optical spot 154, the reflectivity signal from the position mark 744 detected within the FWHM diameter 156 of the optical spot 154 does not add a component to the position error signal (PES) and does not, thus, drive the head 370 away from track 2. Additionally, in contrast to the embodiment illustrated in FIG. 8(b), the particular pattern of position marks uses less in-track media space in the servo sectors 178, which, thus, leaves more space available for data storage in the data wedges 177.

Figure 8E:
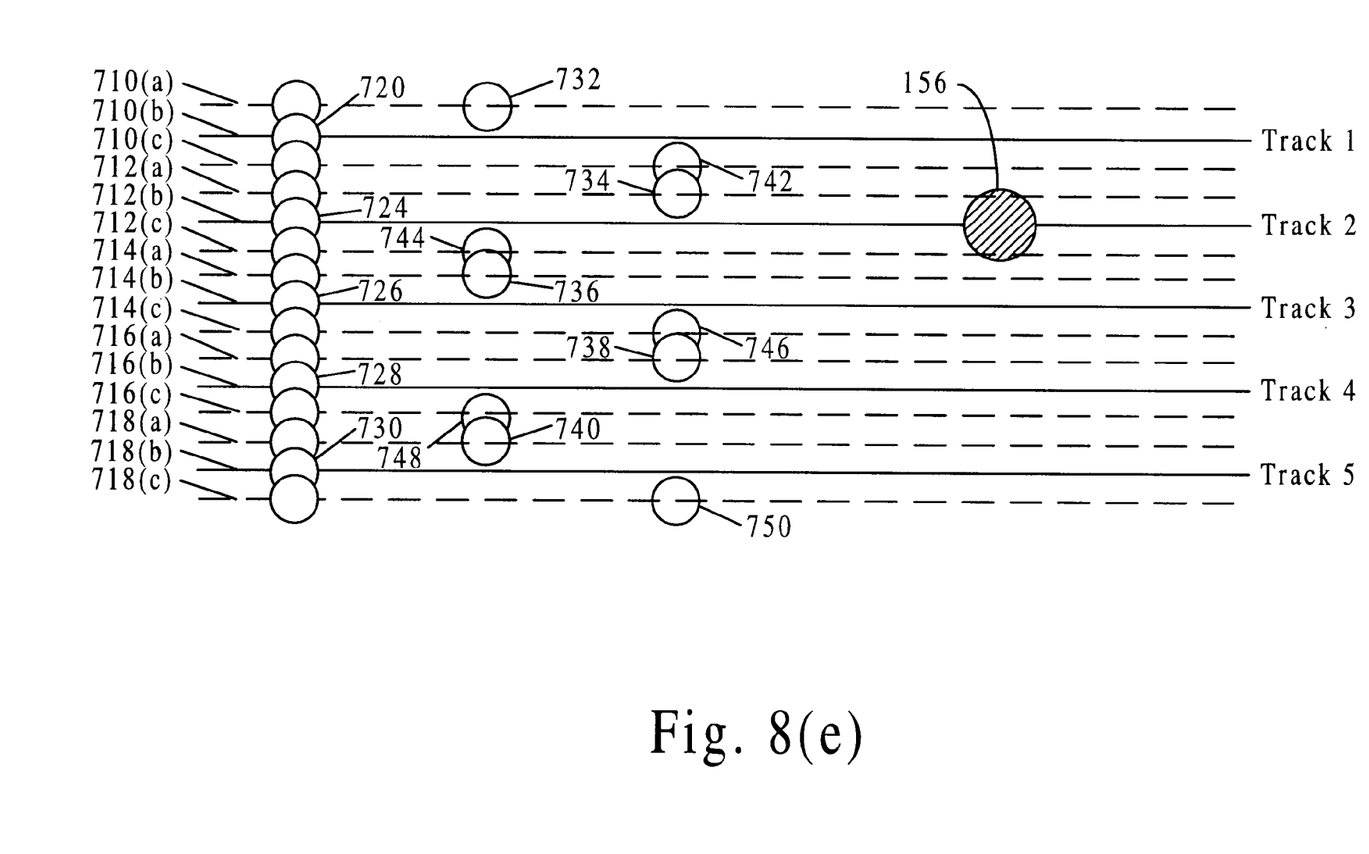
FIG. 8(e) is a diagram illustrating the preferred method of embossing position marks on a storage media according to the present invention.

Referring now to FIG. 8(e), a diagram illustrating the preferred method of embossing position marks 720–750 on a storage media 110 is shown. Initially, a master disk is made by coating a thick piece of glass with a photo-resist material and then embossing (exposing and developing) the position marks into the photo-resist material in selected locations using a precision laser. For maximum interference with reflectivity, the position marks should have a depth of one quarter wavelength of laser 455. The pre-patterned photo-resist material is then plated with nickel and used to stamp individual pre-patterned storage media 110 out of the selected disk material.

As illustrated in FIG. 8(e), the master disk is made using a process in which a sequential series of passes 710(a) through 718(c) are made to emboss position marks 720–750. Each track 1–5 (shown with solid lines) has three associated embossing passes. For example, track I is sequentially embossed with a first pass 710(a), a second pass 710(b) and a third pass 710(c). First pass 710(a) writes a sync mark (adjacent to mark 720) and then writes offset mark 732. Second pass 710(b) writes sync mark 720 directly centered on track 1. Finally, third pass 710(c) writes a sync mark (adjacent to mark 720) and then writes offset mark 742. The above process is then sequentially repeated for the remaining unembossed tracks to complete the embossing process for the master disk. As illustrated in FIG. 8(e), this embossing technique provides a bar of sync position marks (three per track) across storage media 110.

Figure 9:
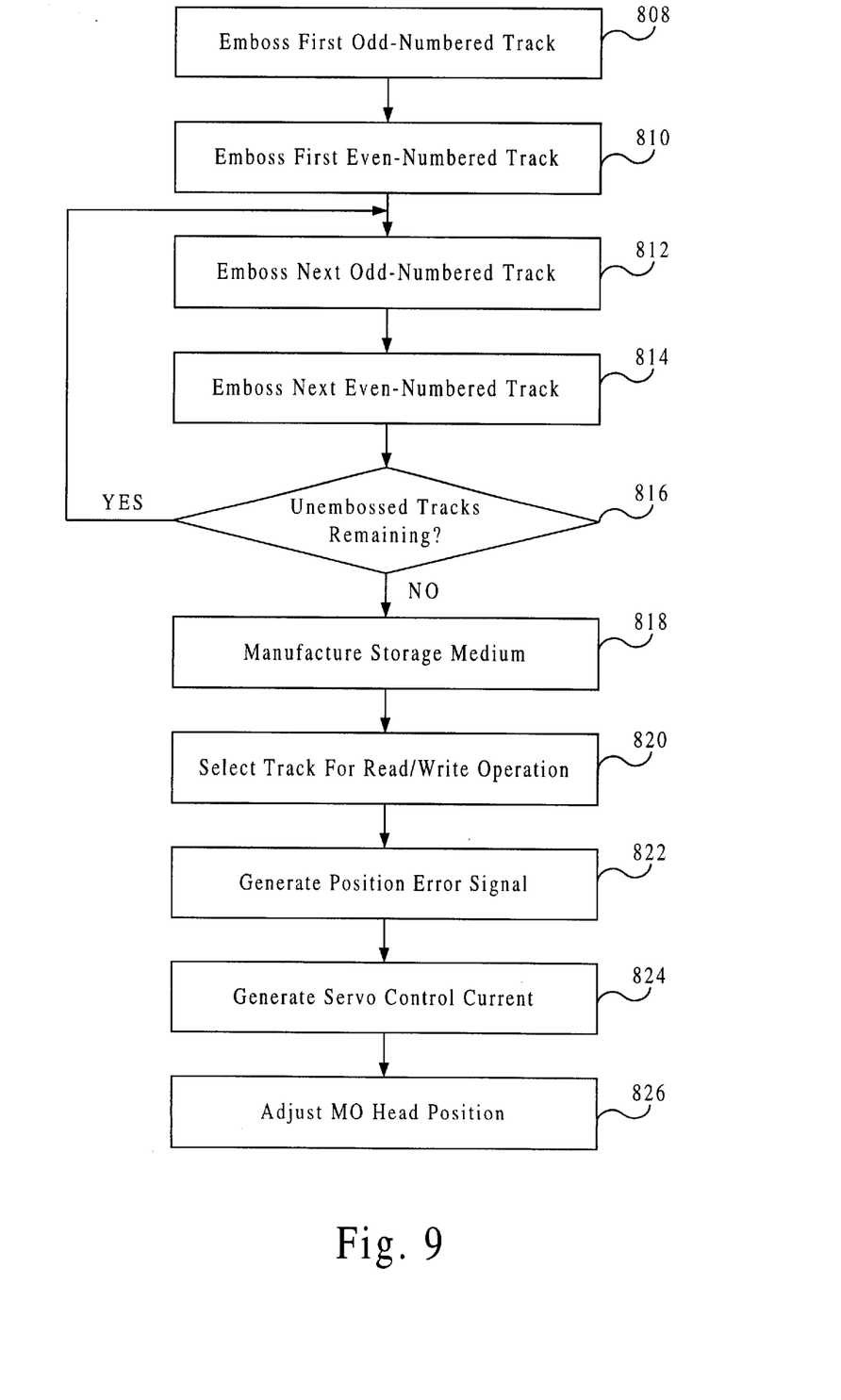
FIG. 9 is a flowchart of method steps for generating a position error signal, according to the present invention.

Referring now to FIG. 9, a flowchart of method steps for generating a position error signal is shown, according to the present invention. The initial steps 808 through 816 for manufacturing the pre-patterned storage media 110 are typically performed in a manufacturing facility. The subsequent steps 818 through 824 occur after the pre-patterned storage media 110 is installed and used in a read/write operation within magneto-optical drive 222. Initially, in step 808, the first odd-numbered track of a master disk is embossed with position marks as shown in FIG. 7(e). Next, in step 810, the first even-numbered track is embossed with position marks as shown in FIG. 7(e). Then, in step 812, the next odd-numbered track is embossed with position marks as shown in FIG. 7(*e*). In step 814, the next even-numbered track is embossed with position marks as shown in FIG. 7(*e*)).

In step 816, if unembossed tracks remain, then the FIG. 8 process goes back to step 812. However, if all tracks have been embossed as described in conjunction with FIG. 7(*f*), then the master disk, in step 818, is used to manufacture storage media 110 which is installed in MO drive 222, according to the present invention.

In step 820, MO drive 222 selects a track 114 on storage media 110 for a read/write operation. Then, in step 822, MO drive 222 generates a position error signal (PES) by reading the embossed position marks on track 114 and responsively using reflectivity channel 514 in drive module 390 to calculate the PES. Next, in step 824, servo control generator 610 in servo module 394 accesses the generated PES and responsively coverts the PES into a servo control current. Finally, in step 826, MO drive 222 uses the servo control current generated by servo control module 394 to advantageously compensate for the off-track position error of flying read/write head 370.

The invention has been explained above with reference to a preferred embodiment. Other embodiments will be apparent to those skilled in the art in light of this disclosure. For example, certain embodiments of position marks may readily be implemented, for example, the embodiments of position marks in FIGS. 7(*b*) or 7(*c*) could also be used to reduce spacing between adjacent tracks in conventional magneto-optical media, wherein an aperture is not utilized. Additionally, the present invention may effectively be used in conjunction with other optical storage systems other than the one described above as the preferred embodiment. Therefore, these and other variations upon the preferred embodiments are intended to be covered by the present invention, which is limited only by the appended claims.

What is claimed is:

1. A data storage system comprising: a storage media, wherein said storage media includes position marks and tracks, wherein said position marks are disposed along said tracks, wherein said tracks have a center axis, wherein said tracks have a perpendicular first direction from said center axis, and wherein said tracks have an opposing perpendicular second direction from said center axis;

a head device for directing a light beam towards said position marks and for sensing a reflection of said light beam from said position marks, wherein said light beam comprises an optical spot having a full width half maximum (FWHM) diameter associated therewith, said tracks being adjacently disposed on said storage media with a distance between said adjacently disposed tracks that is approximately FWHM diameter plus a tracking misregistration width; and a correction device coupled to said head device for detecting said reflection of said light and to generate position error signals from said reflection of said light and to adjust said head device over said storage media based on said position error signals.

2. The system of claim 1, wherein said position marks include synchronization marks, "A" error marks positioned in said first direction, and "B" error marks positioned in said second direction, said marks having a depth of one quarter of a wavelength of said light beam.

3. The system of claim 1, wherein said tracks are adjacently disposed on said storage media with a distance between said adjacently disposed tracks that is less than two times the order of said FWHM diameter.

4. The system of claim 1, wherein said position marks include synchronization marks, "A" error marks positioned in said first direction, and "B" error marks positioned in said second direction, and wherein error marks comprise an outer diameter that is approximately ⅔ said diameter at said FWHM.

5. The system of claim 1, wherein said position marks include synchronization marks, "A" error marks, and "B" error marks; wherein said tracks may be identified by sequential whole numbers; wherein said tracks comprise sequential track pairs having adjacent odd-numbered tracks and even-numbered tracks; wherein each one of said odd-numbered tracks sequentially includes:

one of said synchronization marks positioned directly on said center axis of said odd-numbered track, an odd "A" error mark positioned a perpendicular distance from said center axis of said odd-numbered track in said first direction, and an odd "B" error mark positioned said perpendicular distance from said center axis of said odd-numbered track in said second direction;

wherein each one of said even-numbered tracks sequentially includes:

one of said synchronization marks positioned directly on said center axis of said even-numbered track, an even "A" error mark positioned a perpendicular distance from said center axis of said even-numbered track in said first direction;

an even "B" error mark positioned said perpendicular distance from said center axis of said even-numbered track in said second direction; and wherein said even "A" error mark being perpendicularly adjacent to said odd "B" error mark in said first direction, and said even "B" error mark being perpendicularly adjacent to said odd "A" error mark in said second direction.

6. The system of claim 5, wherein said even "A" error mark overlaps said odd "B" error mark, and wherein said odd "A" error mark overlaps said even "B" error mark.

7. The system of claim 6, wherein said storage media comprise a magneto-optical material.

8. The system of claim 7, wherein said magneto-optical material comprises a magnetic super resolution structure.

9. The system of claim 6, wherein said position error signal is derived from a sensed reflectivity difference between said "A" error marks and said "B" error marks, said position error signal being converted into a servo control current to adjust said head device.

10. The system of claim 9, wherein said servo control current is used to control a coarse actuator head arm to adjust said head device over said stored information.

11. The system of claim 5, further comprising at least one optical fiber, wherein said light beam passes through said optical fiber.

12. The system of claim 1, wherein said position marks include synchronization marks, "A" error marks, and "B" error marks; wherein said tracks may be identified by sequential whole numbers; wherein said tracks comprise sequential track pairs having adjacent odd-numbered tracks and even-numbered tracks; wherein each one of said odd-numbered tracks sequentially includes:

one of said synchronization marks positioned directly on said center axis of said odd-numbered track, an odd "A" error mark positioned a perpendicular distance from said center axis of said odd-numbered track in said first direction, and an odd "B" error mark positioned said perpendicular distance from said center axis of said odd-numbered track in said second direction;

wherein each one of said even-numbered tracks sequentially includes one of said synchronization marks positioned directly on said center axis of said even-numbered track, an even "A" error mark positioned a perpendicular distance from said center axis of said even-numbered track in said first direction;

an even "B" error mark positioned said perpendicular distance from said center axis of said even-numbered track in said second direction; and wherein said odd and even numbered tracks are equidistant about a midpoint therebetween, and wherein said even "B" mark and said odd "A" mark overlaps said midpoint, and wherein said even "A" mark and said odd "B" mark overlaps said midpoint.

13. The system of claim 12, further comprising at least one optical fiber, wherein said light beam passes through said optical fiber.

14. A storage media comprising: tracks and position marks, wherein said tracks are adjacently disposed on said storage media with a distance between said adjacently disposed tracks that is approximately a full width half maximum (WE) diameter of an optical spot of a light beam directed at said position marks, said tracks comprising a center axis, said position marks comprising synchronization marks, "A" error marks, and "B" error marks, wherein said tracks may be identified by sequential whole numbers; wherein said tracks comprise sequential track pairs having adjacent odd-numbered tracks and even-numbered tracks; wherein each one of said odd-numbered tracks sequentially includes:

one of said synchronization marks positioned directly on said center axis of said odd-numbered track, an odd "A" error mark positioned a perpendicular distance from said center axis of said odd-numbered track in said first direction, and an odd "B" error mark positioned said perpendicular distance from said center axis of said odd-numbered track in said second direction;

wherein each one of said even-numbered tracks sequentially includes:

one of said synchronization marks positioned directly on said center axis of said even-numbered track, an even "A" error mark positioned a perpendicular distance from said center axis of said even-numbered track in said first direction;

an even "B" error mark positioned said perpendicular distance from said center axis of said even-numbered track in said second direction; and wherein said even "A" error mark being perpendicularly adjacent to said odd "B" error mark in said first direction, and said even "B" error mark being perpendicularly adjacent to said odd "A" error mark in said second direction.

15. A storage media comprising: tracks and position marks, wherein said tracks are adjacently disposed on said storage media with a distance between said adjacently disposed tracks that is approximately a full width half maximum (FWHM) diameter of an optical spot of a light beam directed at said position marks, said tracks comprising a center axis, said position marks comprising synchronization marks, "A" error marks, and "B" error marks, wherein said tracks may be identified by sequential whole numbers; wherein said tracks comprise sequential track pairs having adjacent odd-numbered tracks and even-numbered tracks; wherein each one of said odd-numbered tracks sequentially includes:

one of said synchronization marks positioned directly on said center axis of said odd numbered track, an odd "A" error mark positioned a perpendicular distance from said center axis of said odd-numbered track in said first direction, and an odd "B" error mark positioned said perpendicular distance from said center axis of said odd-numbered track in said second direction;

wherein each one of said even-numbered tracks sequentially includes:

one of said synchronization marks positioned directly on said center axis of said even-numbered track, an even "A" error mark positioned a perpendicular distance from said center axis of said even-numbered track in said first direction;

an even "B" error mark positioned said perpendicular distance from said center axis of said even-numbered track in said second direction; and wherein said odd and even numbered tracks are equidistant about a midpoint therebetween, and wherein said even "B" mark and said odd "A" mark overlaps said midpoint, and wherein said even "A" mark and said odd "B" mark overlaps said midpoint.

* * * * *